INVENTORS R. M. GENKE
R. W. KETCHLEDGE
R. E. SAGER

BY Charles Scott Phelan
ATTORNEY

United States Patent Office 3,295,116

Patented Dec. 27, 1966

3,295,116

MAGNETIC MEMORY DRIVE CIRCUITS FOR PRODUCING STEPPED DRIVE PULSES

Richard M. Genke, Colts Neck, Raymond W. Ketchledge, Rumson, and Richard E. Sager, Jackson, N.J., assignors to Bell Telephone Laboratories, Incorporated, New York, N.Y., a corporation of New York Filed Dec. 23, 1963, Ser. No. 332,471
24 Claims. (Cl. 340—174)

This invention relates to an arrangement for driving a magnetic memory system. The invention relates more particularly to a memory driving arrangement which is adapted to reduce the effects of delta noise in the output, or sensing, circuit of the memory and to achieve other beneficial effects in the memory. This application is a continuation-in-part of our copending application Serial No. 251,214, filed January 14, 1963, now abandoned.

Some salient developments in magnetic memory system art are reviewed at the outset in order that the lines of distinction between the present invention and known art may be readily apparent.

Bistable magnetic devices are well known in the art. Such devices are characterized by substantially rectangular hysteresis characteristics defining two stable states of remanent magnetic flux of opposite polarity between which the devices may be switched by the application of a magnetomotive force of appropriate polarity and magnitude. It is also known that, within either of the two stable states of such devices, the devices can rest in any one of at least two remanent flux density levels. The particular flux density level at which a device resides within its prevailing stable condition is primarily dependent upon the number, polarity, and magnitude of noise signals of less than switching magnetomotive force which have been applied to the device since the prevailing stable condition was established. Similarly, the amount of voltage induced in a circuit linking the device is a function of the magnitude and polarity of a driving magnetomotive force applied to the device, as well as the particular state in which the device rests and the particular remanent flux density level of the state that prevails. The aforementioned characteristics of bistable magnetic devices generally are also characteristic of an apertured ferrite sheet which has been treated in a manner now known in the art to establish such characteristics in the portions of the sheet surrounding each aperture thereof.

Bistable magnetic devices of the type described have been incorporated into magnetic memory systems wherein a device is placed in one of its two stable states to store binary coded information bits designated ONE and ZERO, respectively. In the case of ferrite sheets, the apertures of such sheets have been interconnected to form a memory in a manner which is disclosed, for example, in the copending application, Serial No. 179,870, filed March 15, 1962, in the name of P. A. Harding. In such a magnetic memory system, a particular bistable storage device may be selected during an interrogation interval to read out the information stored therein, or during a write-in interval for writing information into storage, by the application of coincident current pulses to plural drive circuits linking the selected device. The total magnitude of the applied coincident currents must be sufficient to generate within the device the minimum magnetomotive force required to accomplish device switching between stable states, or, alternatively, to suppress device switching.

Usually in coincident current memories the minimum magnetomotive force required to switch a bistable magnetic device in a prescribed time interval is in the full-select force and the drive current producing that force in the device is a full-select drive current. Each of the coincident drive currents producing the net full-select force is a fraction of the full-select current magnitude; and, where two read-out coincident currents are employed, each has approximately half-select magnitude. The half-select magnitude is assigned a maximum value which is slightly less than that needed to produce the coercive magnetomotive force in the magnetic device, and the coercive force is that which is required to drive a device to the knee of its hysteresis characteristic where extensive nonreversible flux switching begins.

Theoretically, the signal induced in a sensing circuit which links a selected device of the memory has a magnitude which indicates which of the two stable conditions existed in the selected device prior to the application of read-out signals. However, in supplying current pulses to the selected device from the drive circuits, each of the coincident currents of partial-select magnitude, e.g., half-select magnitude, links a plurality of devices which are not selected for operation as well as linking the one device that is to be operated. Furthermore, the sensing circuit of the memory also links many of the partially selected devices and has induced therein at each such device location a noise signal corresponding to the partial-select drive signal magnitude. This noise signal results from the fact that the half-select signals which are coupled to those half-selected devices switch a small amount of flux and alter the remanent flux density level of each such device by an amount which depends upon the prevailing state of the device and the previous half-select history of the device since the prevailing state was established. Although insufficient flux is switched to constitute a switch of the device, a noise is coupled to the sensing circuit as a result of the small flux that is switched.

Usually sensing circuits in magnetic memories are routed through the various bistable magnetic devices in a manner which contemplates noise cancellation pairs of devices. For each device linked by the sensing circuit with one linking polarity with respect to drive circuit linkages at the same device, there is one other device which the sensing circuit links in opposite sense with respect to the same drive circuits. Half-select noises which are magnetically coupled by the devices from the drive circuits to the sensing circuit tend to cancel one another as between the devices of a pair. The cancellation is imperfect either because the half-selected devices may have a binary information content representing any permutations of binary ONES and ZEROS or because each device of a cancellation pair may have a different half-select history. Consequently, there is generally a net cancellation noise resulting from such imperfect cancellations; and this noise, which appears in the sensing circuit along with the desired signal, is termed "delta" noise.

Accordingly, it is one object of the present invention to reduce the influence of delta noise in the sensing circuit of magnetic memory systems.

Attempts have been made to reduce the delta noise in some magnetic memory systems by arranging the bistable magnetic devices in a rectangular matrix array and by driving the long dimension of the rectangle before the short dimension is driven so that the noise generated in the long dimension can subside before read-out begins when the short dimension of the memory is subsequently driven. This approach has not been entirely satisfactory in any practical memory. In sheet memories the early drive of a single access circuit does not accomplish sufficient noise reduction by itself so that useful output signals may thereafter be obtained from the memory during the actual read-out interval. However, in addition, it is well known that a greater number of access circuit switches are required to define any given number of memory locations in a rectangular array than are required to define the same number of locations in a square, or equilateral, array. Thus, the rectangular array is more costly than a square one, and it does not in actual practice reduce noise to a sufficiently low level to be useful in ferrite sheet memories. Similarly, the square array has fewer memory locations receiving half-select signals and producing noise than does the rectangular array.

In some prior art magnetic memory systems attempts have been made to improve the noise situation in early-drive rectangular arrays by guaranteeing a balanced drive signal in the access circuit which drives devices along the short dimension of the rectangular array. In these systems the output sensing circuits include integrating means which are responsive to the unbalanced switching signal at the selected memory location but which are relatively insensitive to the balanced noise signals generated in the drive circuit for the short dimension of the array. The integration approach does not, of course, correct the equipment inefficiency of a rectangular array, and the read-write cycle time which is required to assure a relatively balanced drive signal is appreciable. Furthermore, the approach of balanced drive signals and integration in the sensing circuit is completely inoperative in memory systems which employ an inhibiting drive circuit for use in conjunction with the normal X and Y drive circuits of a matrix array to write in one of the two types of binary information.

It is therefore another object of the invention to reduce delta noise in the sensing circuit of a memory by means which are adaptable to equilateral memory arrays and which are useful in memory systems which employ the inhibit type of write-in method.

Another popular type of memory system accomplishes some reduction in delta noise by applying half-select signals to the inhibit circuit of the memory after the write-in portion of the read-write memory cycle has been completed. This end-of-cycle inhibit pulse disturbs the magnetic devices which are linked thereby to a predetermined flux density level for the prevailing state of the device. That type of operation, sometimes called post-write disturb, requires a substantial extension of read-write cycle time because a substantial amount of time is required to raise the inhibit circuit signal to the half-select level once more after the write-in operation has been completed.

It is therefore another object of the invention to reduce delta noise effects in magnetic memories without utilizing post-write disturb on the memory inhibit circuits.

It was previously mentioned that ferrite sheet memories can be constructed. This type of memory permits extraordinary reductions in memory module size while still maintaining relative ease of manufacture. However, when sufficient leads are linked in an aperture of such a memory to complete the X and Y drive circuits, an inhibit circuit, and a sensing circuit, the insulated circuit leads employed are generally in physical contact with one another with the result that there is substantial spurious capacitive coupling among the circuits at the operating frequencies of the memory The capacitances providing this coupling tend to dissipate drive signal energy at the beginning of the drive interval and thereby delay the switching of selected devices in the read-out interval.

Accordingly, a further object is to reduce the effects of such spurious capacitive coupling among the memory drive circuits.

In many prior art magnetic memory systems the drive signal waveforms have initial transitions at the beginning of the read-out interval with a magnitude which is equal to the half-select magnitude of the drive signals. This large transition helps to switch the selected magnetic device in the memory, but in ferrite sheet memories wherein the various memory circuits are so close to one another that they are capacitively coupled, the noise resulting from the drive signal transition causes substantial noise difficulty during the read-out interval. The noise has a spectrum of frequencies which includes as a principal energy component thereof the fundamental operating frequency of the memory. Thus, the noise which is coupled to the sense circuit by spurious capacitive coupling cannot easily be separated from the desired signal which is induced in the sensing circuit at the selected memory location.

It is, accordingly, yet another object of the invention to reduce the effects of capacitively coupled noise in sensing circuits of a ferrite sheet memory.

The various objects and advantages of the invention are realized in an illustrative embodiment thereof in a coincident current magnetic memory. Each cycle of memory operation includes an interrogation time during which coincident drive currents of one polarity are applied to read stored information out of selected memory locations. The cycle also includes a writing time during which coincident drive currents of a second polarity, and inhibit drive signals of the one polarity if required, are applied to store binary coded information in the selected memory locations. In accordance with the present invention any one or more of the drive signal transitions are accomplished in plural steps.

It is one feature of the invention that simple logic blocks are used under the control of clock signals for dividing memory cycle intervals into drive pulse transient step parts. For example, the interrogation interval of a magnetic memory is divided into a preconditioning part and a read-out part. The signals from the logic blocks control split current drivers for providing drive current to the read circuits of the memory with less than normal read amplitude during the preconditioning part of the interrogation interval. Subsequently, the logic circuits cause the drivers to increase the drive current to full read-out magnitude during the read part of the interrogation interval.

An important feature of the use of a stepped drive at the beginning of an interrogation interval is that the reduced amplitude steps produce magnetomotive forces in selected memory devices which magnetically bias such devices toward a predetermined remanent flux level of the prevailing stable magnetic state of such device. This action stabilizes the magnitudes of shuttle noises which occur during read-out time.

It is another feature that the aforementioned magnetic bias is so adapted that the noise voltages generated in the sensing circuit during the subsequent read interval are relatively independent of the nature of the stored information and of the half-select history of each individual storage device. Thus, the sense circuit wiring pattern of canceling pairs of device linkages in the memory can be used to accomplish improved cancellation of delta noise.

It is a further feature that logic circuits actuate incremental current control means so that each drive current step is maintained for a sufficient interval to allow the voltage surge from the preceding step transition to be substantially dissipated before another step is initiated.

Another feature of the invention is that reduced amplitude preread drive signals on all read drive circuits are of insufficient total magnitude to develop the magnetomotive force required to switch a magnetic storage device. Accordingly, they are advantageously used in the manner described to reduce delta noise in either square or rectangular memory arrays. Furthermore, those preread signals eliminate any need for sensing circuit integration of noise so that inhibit-type write-in operations are conveniently employed.

A further feature is that reduced magnitude early drives, when applied to the access circuits used in a memory for applying read-out signals, reduce the need for post-write disturb signals on the inhibit circuit. Less time is required to disturb with reduced amplitude preread drives on read drive circuits than with normal drive amplitude on inhibit circuits. Consequently, the reduced drives contribute to substantial reduction in the memory cycle time. In addition, the function of the reduced preread drive is compatible with the following read drive and does not require a time guard space to prevent interference with the read-out operation.

Still another feature is that reduced magnitude preread drive signals are advantageously employed in memory systems utilizing apertured ferrite sheets. The reduced preread signals precharge the spurious capacitances, which are characteristic of such memory systems, before the actual read-out time begins, so that the capacitances have a substantially reduced dissipating effect upon drive signals during the memory read-out interval.

An additional featured aspect of the invention is that logic circuits actuate current control means to reduce drive pulses in steps so that resulting noises dissipate more rapidly.

Another important advantage of the reduced precharge drive signals of the invention is that they form with the normal read interval drive signals a stepped drive wave in which all but the final step is completed prior to the read interval so that the drive signal transition which occurs at the outset of the read interval is substantially smaller in magnitude and duration than the usual drive signals which have a half-select leading edge transition in each drive circuit. The noise frequency spectrum of the reduced duration read transition signal according to the invention is in a much higher frequency range than the noise of the usual drive signal. In particular, the reduced transition noise spectrum is sufficiently above the top memory operating frequency that a low-pass filter is advantageously utilized in the sensing circuit to reject the noise spectrum frequencies that constitute the bulk of the noise energy.

A more complete understanding of the invention and its various objects, features, and advantages can be obtained from the following detailed description, and the appended claims, when considered in connection with the attached drawings in which:

Figure 1:
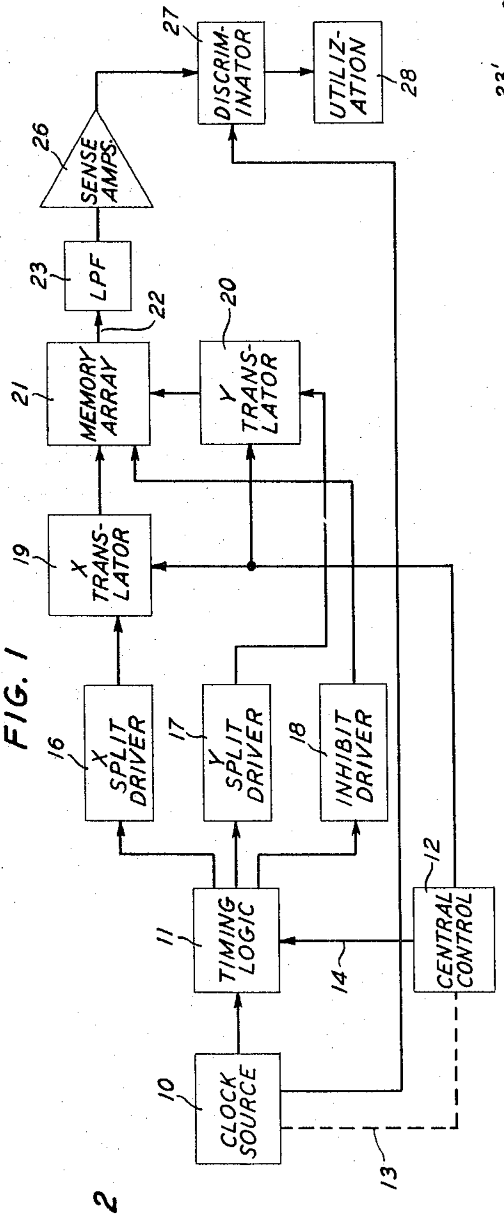
FIG. 1 is a block and line diagram of a magnetic memory system in which the invention may be utilized.
Figures 3, 5, 7:
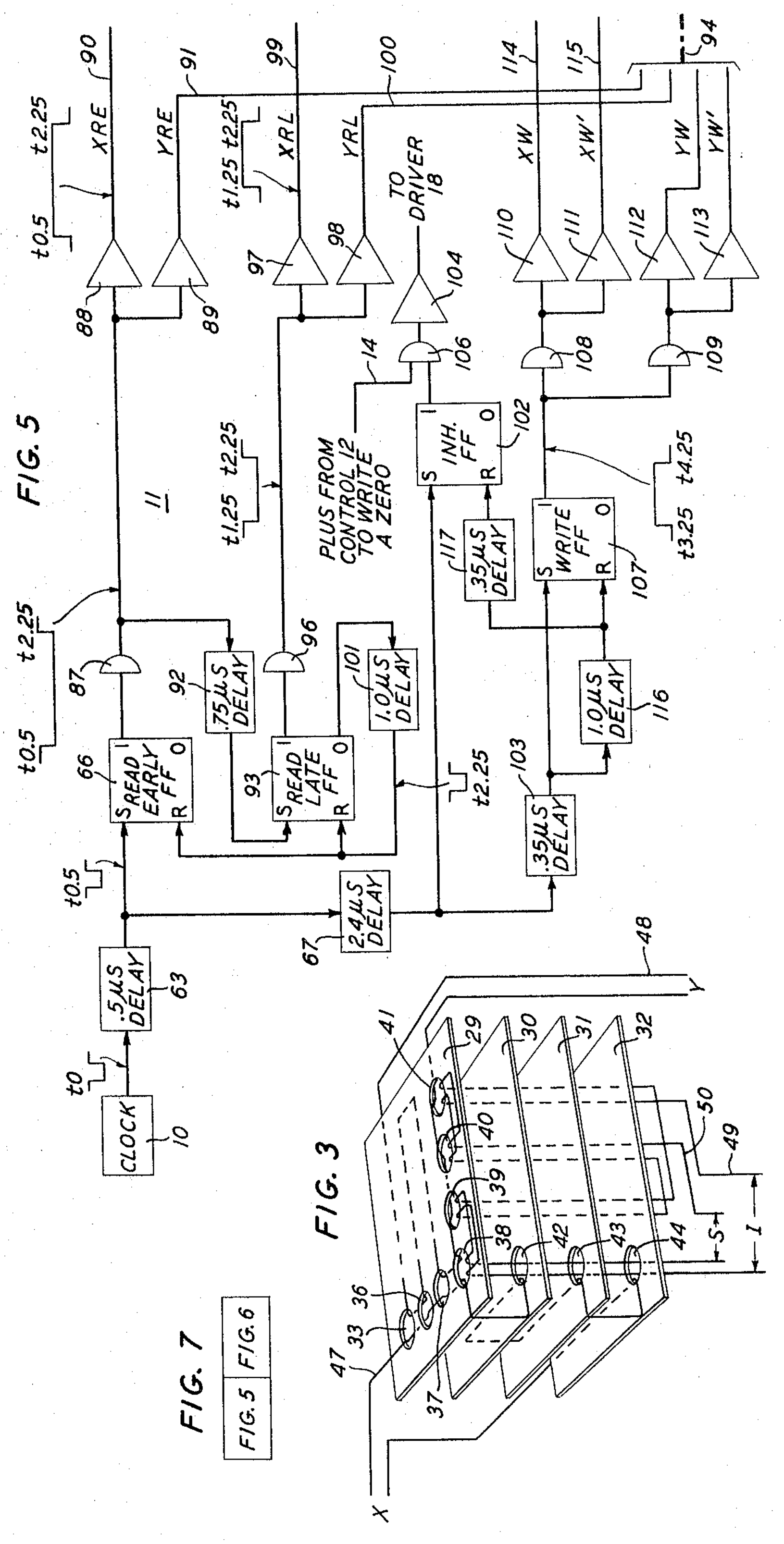
FIG. 3 illustrates in simplified form a magnetic memory utilizing a stack of apertured ferrite sheets.
Figure 6:
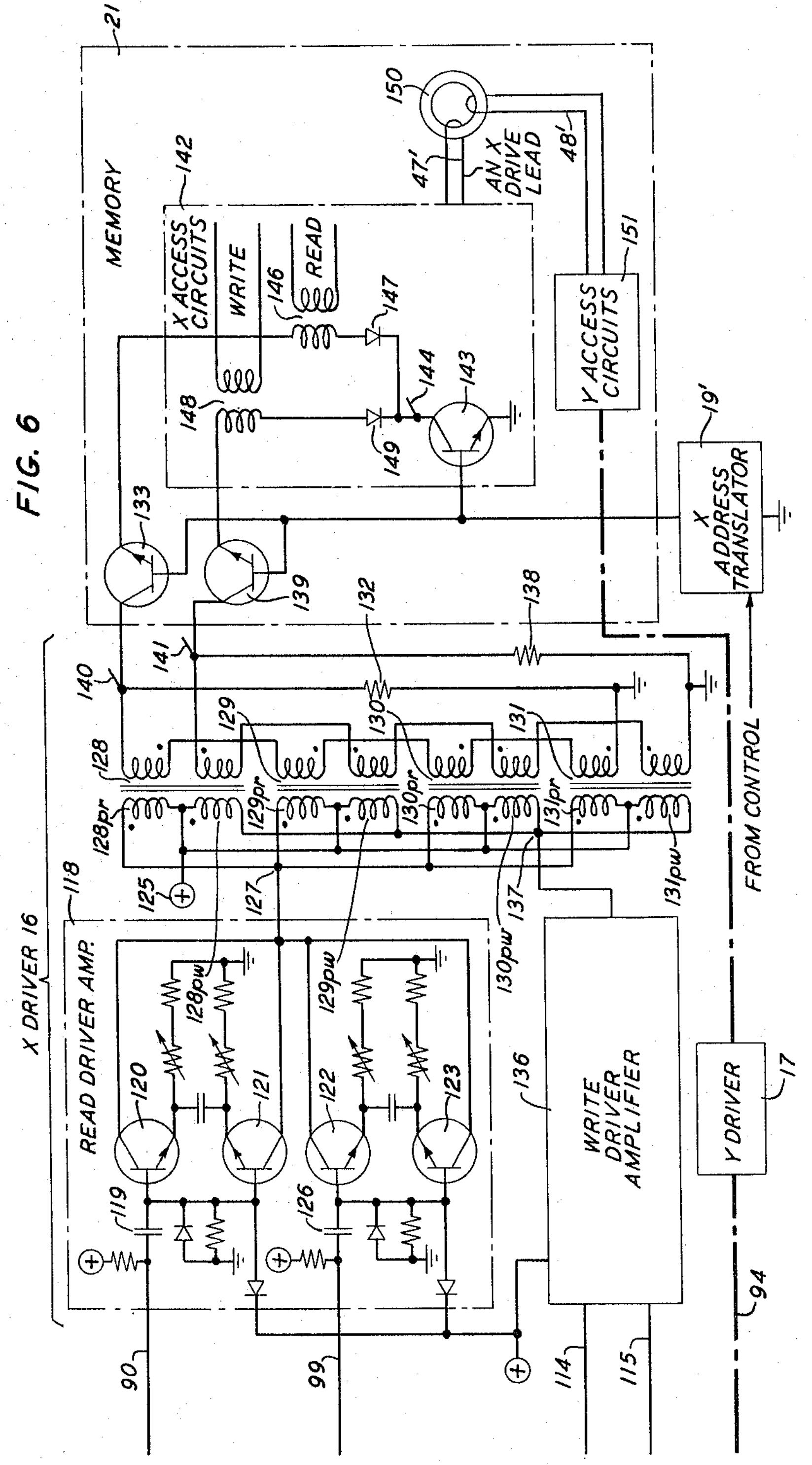
Figure 9:
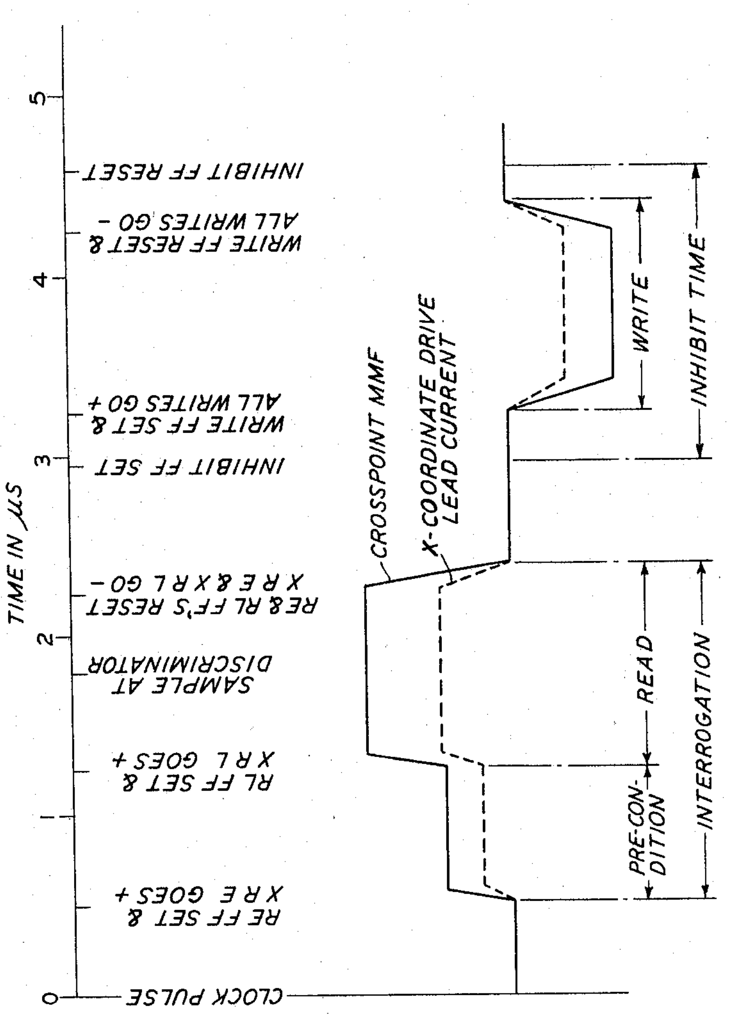
Figure 8:
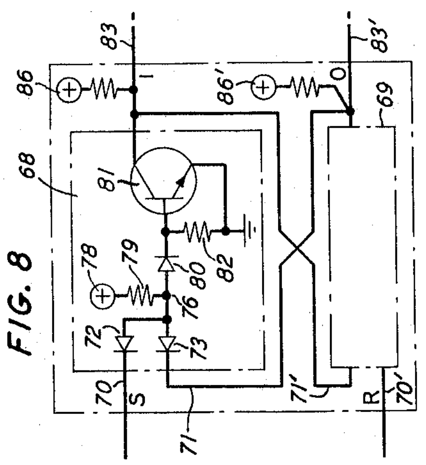
Figure 10:
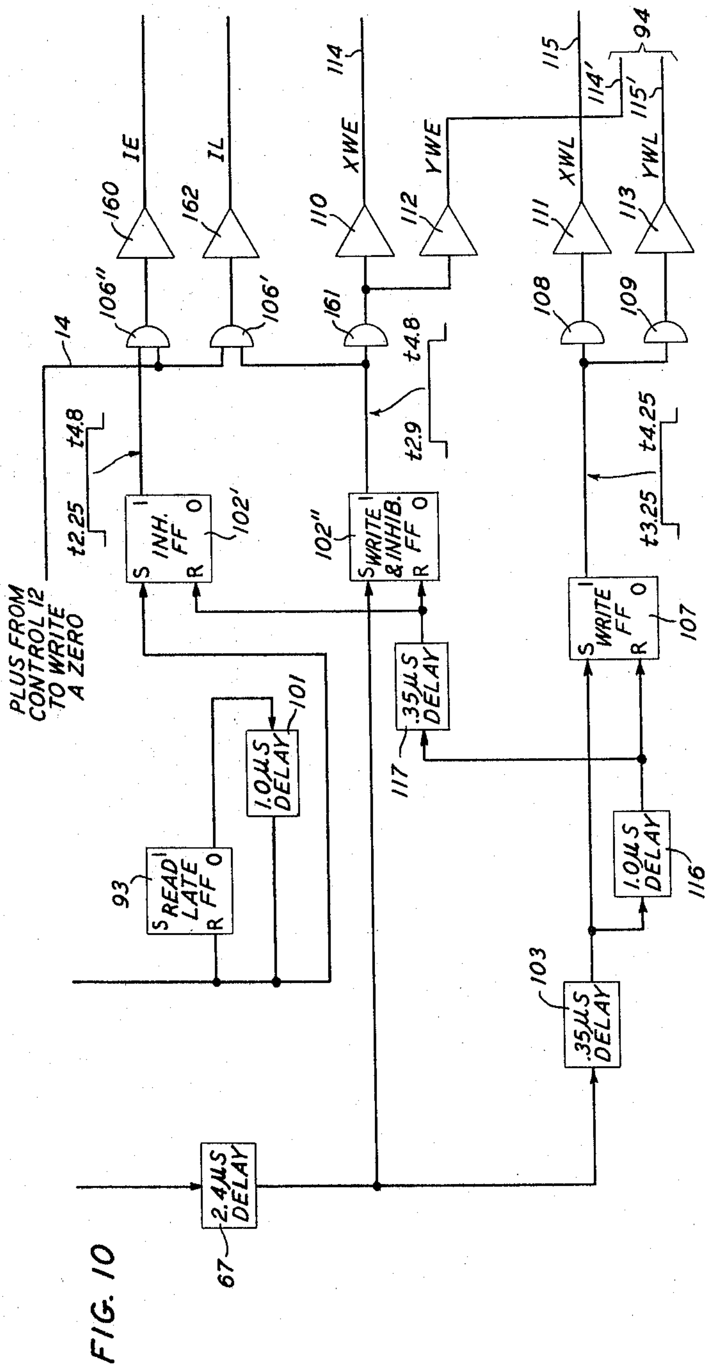
Figure 11:
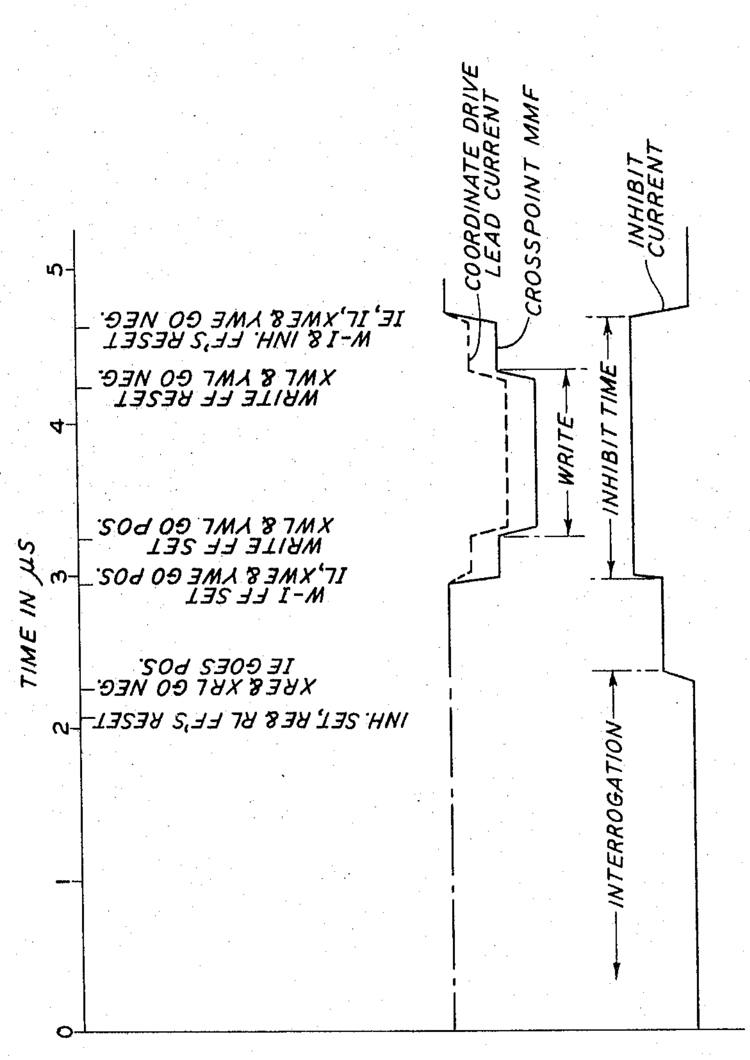

FIGS. 5 and 6 comprise together a diagram that is partially in block and line form and partially in schematic form illustrating details of the portion of the system in FIG. 1 which includes the principal circuits of the present invention;

FIG. 7 is a diagram illustrating the manner in which FIGS. 5 and 6 are to be combined;

FIG. 8 is a schematic diagram of a logic block of the type used in FIG. 5;

FIG. 9 is a timing diagram illustrating the operation of the circuits in FIGS. 5 and 6;

FIG. 10 is a block and line diagram of modified logic circuits of the type shown in FIG. 5; and FIG. 11 is a timing diagram illustrating the operation of the circuits of FIGS. 10 and 6.

In FIG. 1 a source 10 of clock signals is connected to actuate timing logic circuits 11 in accordance with a system program for the memory as directed by a central control 12. A dotted line 13 interconnecting clock source 10 and central control 12 indicates schematically that the two units are arranged to operate in synchronism. The output from logic circuits 11 controls three current pulse drivers 16, 17, and 18 for the memory system. Drivers 16 and 17 are split drivers that are specially adapted for cooperation with logic circuits 11 to select different drive signal amplitudes. In accordance with the present invention the logic circuits 11 are so operated by central control 12 that one or more of the drivers 16, 17, and 18 are caused to produce output signals which have at least one stepped signal amplitude transition. Details of the manner in which logic circuits 11 control drivers 16, 17, and 18 for this purpose are subsequently discussed in connection with FIGS. 5, 6, and 10.

In the subsequent description of the memory system embodiment of the invention, a random access, three-dimensional, word-oriented memory is assumed for purposes of illustration. Drivers 16 and 17 supply current drive pulses to the coordinate X and Y circuits, respectively, of the memory. An X address translator 19 and a Y address translator 20 operate in response to the output of central control 12 to control the coupling of drive pulses from the X and Y drivers 16 and 17 to a particular address of a memory array 21 in order to read out information stored at that address location. A sensing circuit 22 couples output signals from the memory array 21 through a low-pass filter 23 and a sensing amplifier 26 to the input of an amplitude discriminating circuit 27. The discriminating circuit operates under the control of signals from clock source 10 to sample the sense circuit output and provide to utilization circuits 28 a signal which indicates whether the information stored in the selected location of memory array 21 was a binary ONE or a binary ZERO. The function of filter 23 in accordance with the present invention will be subsequently described. Although only one sensing circuit 22 and associated filter, amplifier, discriminator, and utilization circuit are shown in FIG. 1, a three-dimensional memory of the type previously assumed would normally include a plurality of such circuits with one set thereof being applied to the digit plane for each digit of the largest word that could be stored in the memory array 21.

Once a read-out has been accomplished, it is necessary to write back into the memory at the same location the same information or new information. This write-back operation is carried out under the supervision of central control 12 which now causes logic circuits 11 to actuate the inhibit driver 18 to produce an output as required in conjunction with a second output from the X and Y drivers 16 and 17 in a manner that is well known in the art. During this write-back interval, clock source 10 does not operate the discriminator 27; and any signals generated in the sensing circuit 22 are, therefore, unable to reach the utilization circuit 28.

Figure 2:
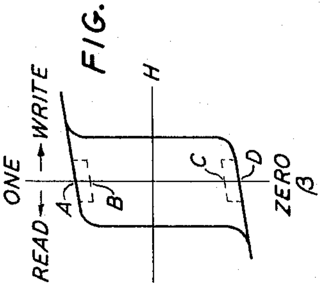
FIG. 2 is a hysteresis diagram of a conventional bistable magnetic device of the type generally found in magnetic memory circuits.

FIG. 2 is a typical rectangular hysteresis characteristic of a bistable magnetic device of the type which normally is formed by ferrite sheet material defining a single aperture in the sheet when the sheet has such bistable characteristics. The characteristic of FIG. 2 defines two stable states of magnetic flux remanence A and D which represent a binary ONE and a binary ZERO, respectively, in a binary information coding system. If the prevailing condition of a device is the ONE, or A, condition, the application of a full-select magnetomotive force in the read direction causes the device to switch to the state D which is characterized by a similar, but oppositely poled, flux density. Similarly, the application of a full-select force in the write direction switches the device from the D back to the A condition. In either of the aforementioned A and D conditions the application of a field intensity with a fraction of the full-select magnitude, i.e., a part-select force, may cause an alteration of the remanent flux density characterizing the magnetic device stable state but does not cause a switch from one stable state to the other.

Thus, if a device has a ONE stored therein and is residing at the A remanent flux condition represented in FIG. 2, the application of a part-select magnetomotive force in the read direction reduces the prevailing flux density to the point B. A portion of the flux is switched and the device relaxes to a new flux density condition. However, the application of a second magnetomotive force of the same magnitude and polarity, after the first force has been removed, is unable to produce any significant permanent change in the flux density condition of the device. A different situation results if the part-select field, or magnetomotive force, is applied in the write direction when the device resides at the B condition. In this latter situation a portion of the flux is switched and the device relaxes to the A condition upon removal of the magnetomotive force. However, subsequent applications of further forces of the same intensity and write polarity bring about no significant further change in the remanent flux density condition to which the device relaxes.

In a similar manner, a device in which the ZERO stable condition prevails may be found at the point D on the hysteresis curve in FIG. 2. The application of a part-select force in the write direction shifts the flux density to the C position, and subsequent applications of the same magnetomotive force accomplish no further permanent changes in the flux density. However, application of a similar force in the read direction shifts the device back to the D condition where it remains as long as no further forces with write polarity are applied. Thus, the bistable magnetic devices operating in accordance with the hysteresis curve of FIG. 2 are characterized in that the application of a magnetomotive force with part-select magnitude of a first polarity drives the device from its initial flux density state to a new flux density condition without switching the stable state. However, the application of the same force with opposite polarity, while the device is in the same initial flux density state, causes no permanent change in the flux density.

In a typical ferrite sheet device that is used in a magnetic memory system, the application of a single half-select drive signal to an aperture of the sheet induces in the sense circuit linking the same aperture voltages which differ by several millivolts for binary ONE signals in the A and B flux density states, respectively. A similar difference of several millivolts in the induced noise signal is found for an aperture storing a binary ZERO at the C and D conditions, respectively. This difference in one typical sheet amounts to three millivolts. A difference of the order of four millivolts in the induced noise signal is produced between apertures storing a ONE at the A condition and a ZERO at the D condition, but there is a difference of only about a single millivolt between devices at the A and C conditions, or between devices at the B and D conditions. It is apparent then that there is a considerable variation among the half-select noises generated by the application of half-select read signals to devices in the A, B, C, and D flux density states indicated in FIG. 2. This difference results in delta noise, and it is the partial elimination of such delta noise to which one aspect of the present invention is directed.

FIG. 3 illustrates a greatly simplified three-dimensional magnetic memory comprising four apertured bistable ferrite sheets 29, 30, 31, and 32. This array represents schematically the matrix array of storage devices in memory array 21 of FIG. 1. It is assumed that each sheet in FIG. 3 includes only 16 apertures arranged in an equilateral 4 x 4 array. Since the purpose of FIG. 3 is to illustrate the relationships among the apertures receiving half-select drive signals during different operations of the memory, only ten of the sixty-four apertures in the four sheets are shown. Only seven apertures 33, 36, 37, 38, 39, 40, and 41 are shown in the sheet 29. Likewise, only the apertures 42, 43, and 44 in sheets 30, 31, and 32 are illustrated. An X drive circuit 47 is woven through the apertures 33, 36, 37, and 38 in sheet 29 and through the corresponding apertures in the sheets 30, 31, and 32. In a similar manner a Y drive circuit 48 is woven through all of the apertures in sheet 29 for the application of half-select drive signals thereto. Additional X circuits, not shown, would be provided to link apertures in the four sheets in four planes parallel to the plane of the X circuit 47; and additional Y circuits, not shown would be provided to link apertures of the sheets 30, 31, and 32, respectively. Circuits 47 and 48 both link the apertures 33, 36, 37, and 38 which define a four-bit binary coded word.

An inhibit circuit 49 links the apertures 38 through 41 in sheet 29, and all of the corresponding apertures in sheets 30, 31, and 32, for applying inhibit signals thereto during write-in intervals of the memory. A sensing circuit 50 also links all of the apertures to which the circuit 49 is coupled. Accordingly, if half-select drive pulses of the same polarity are applied during the memory read-out period to the X circuit 47 and the Y circuit 48, the word stored in the apertures 33, and 36 through 38, is selected for read-out; but sensing circuit 50 receives, from the selected word, a read-out signal from only the single aperture 38 which is common to all of the circuits 47, 48, and 50. Sensing circuit 50 also receives induced voltages resulting from the application of half-select drive signals to holes 39 through 44, but these tend to cancel one another as hereinafter described, and only the cancellation remainder is left as noise in circuit 50.

Similar sensing and inhibit circuits, not shown, would link other apertures of the four sheets in planes parallel to the illustrated plane of sensing lead 50, and the sensing circuit in each of those planes would receive the read-out signal from a corresponding bit of the selected word.

Write-in for the memory of FIG. 3 is accomplished in the usual manner. Write polarity half-select pulses are applied to the X and Y drive circuits 47 and 48 in order to address the same word location that had just been read out. This action alone tends to write a ONE in each digit location of the word. If a ZERO is to be written in a digit location, such as the location of aperture 38, a read polarity half-select pulse is applied to inhibit circuit 49 so that the magnetomotive force generated thereby at aperture 38 offsets part of the force generated by the X and Y write drive pulses and prevents that aperture from switching to the ONE state.

During the read-out time, sensing circuit 50 receives, in addition to the desired read-out signal, noise voltages generated by half-select signals. In the plane of lead 50, the half-select signal in X circuit 47 links apertures 42, 43, and 44 as well as the selected aperture 38. Similarly, the half-select signal in Y circuit 48 links apertures 39, 40, and 41 as well as the selected aperture 38. These half-select signals produce flux changes, either temporary or permanent, that cause noise voltages to be induced in circuits linking the devices. In each of the half-selected apertures 39 through 44, it can be observed in FIG. 3 that sensing circuit 50 is woven in its digit plane so that it links the apertures 38 and 41 in the same sense as the Y drive circuit 48, and that it links the apertures 39 and 40 in the opposite sense with respect to the drive circuit 48. Similarly, the sensing circuit 50 links apertures 38 and 43 in the X plane in the same sense with respect to the X circuit, and it links apertures 42 and 44 in opposite sense with respect to the X circuit. Thus, within a row of holes in the sense, or digit plane, of the memory in FIG. 3 each half-selected aperture, except one, has a half-select noise voltage induced therein which is of opposite polarity with respect to the noise voltage induced in another aperture along the same drive circuit and in the same digit plane. The hole polarity reversal can be observed more easily in the cross-sectional view of a typical row of apertures in a ferrite sheet as shown in FIG. 4.

Figure 4:
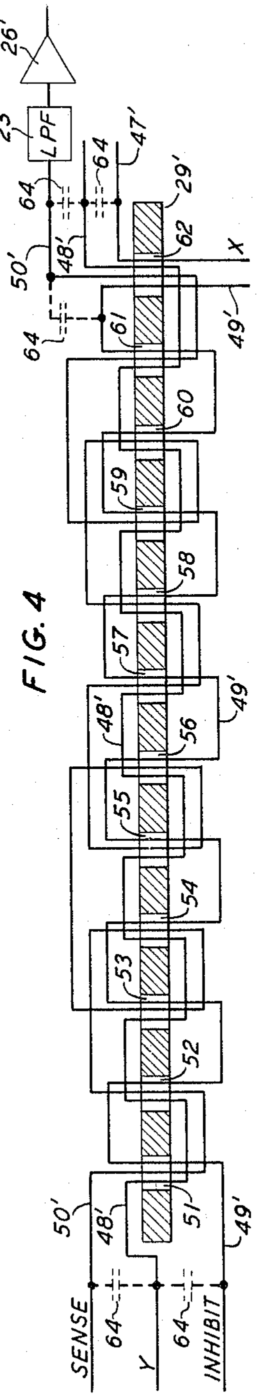
FIG. 4 is a cross-sectional view of a ferrite sheet of the type illustrated in FIG. 3.

In FIG. 4 reference characters similar to those used in FIGS. 1 and 3 are utilized to designate corresponding circuit elements. The sheet illustrated there has considerably more apertures than that shown in FIG. 3 so that the wiring of the drive circuits with respect to the sense circuit 50′ may be more easily observed. Twelve apertures numbered 51 through 62 are provided in the sheet 29′ in FIG. 4. Also indicated here are spurious capacitors 64 connected among the drive and sensing circuits by dotted lines. These capacitors represent capacitive coupling among those circuits at the operating frequencies of the memory as a result of the proximity of the circuits to one another in the sheet apertures. The coupling prevails at all memory locations and among all circuits, and capacitors 64 simply provide a few lumped schematic indications of the coupling. Such coupling exists throughout the memory of FIG. 3 and in the memory array 21 of FIG. 1.

Weaving of the X, Y, and inhibit circuits is constant with respect to one another since these circuits must maintain particular relationships within any given aperture in order to accomplish read-out and write-back functions of the type described and as are well known in the art. However, sensing circuit 50′ has different relationships with these drive circuits in different apertures in order that the half-select noise signals induced in sensing circuit 50′ may be at least partially canceled during the read-out interval. Thus, considering sensing circuit 50′ and Y circuit 48′, the two are woven so that the Y circuit produces in the sensing circuit noise voltages of a first polarity in the apertures 51, 52, 57, 58, 61 and 62, and produces noise voltages of the opposite polarity in the remaining apertures.

When the aperture 62 is selected for read-out, there are five pairs of apertures in sheet 29′ which produce noise voltages that are of opposite polarity and tend to cancel one another. However, since aperture 62 is selected, the other aperture of its pair is a lone half-selected aperture that has no cancellation aperture in the illustrated sheet. There is a similar odd aperture in the group of half-selected apertures in the X plane. The half-select noise generated at these two lone apertures is offset against voltages generated at the selected aperture.

The cancellation effects herein mentioned for pairs of apertures in FIGS. 3 and 4 are theoretically realizable in a perfect system wherein all of the half-selected apertures happen to contain the same binary digit and wherein all have the same previous half-select history. However, as indicated in connection with FIG. 2, this perfect theoretical condition would occur very rarely since the information stored in any particular group of apertures of the memory may include ONES and ZEROS in a variety of permutations.

Furthermore, each aperture in any given group, regardless of the type of information stored, may have a different half-select signal history from every other aperture in the group. That is, for example, apertures 40 and 41 in FIG. 3 may both include binary ONES; but in one case the binary ONE may have been written in during the last preceding read-write cycle of the memory so that it resides in the condition A of FIG. 2; while the other aperture may have received a number of half-select drive signals which would place it in the condition B illustrated in FIG. 2. Thus, the differences in information content and in previous half-select history of each aperture cause each aperture to generate in the sensing circuit in response to a half-select signal a noise voltage which may have any one of at least four magnitudes corresponding to the four remanent flux states indicated in FIG. 2. Noise canceling weaving patterns cannot cope with such a range of amplitude uncertainty in the noise, and the cancellations within cancellation pairs are imperfect. The remaining net noise, delta noise, tends to accumulate from one cancellation pair to another. It has been found in ferrite sheet memories that the accumulation of delta noise in a sense circuit often has a much larger magnitude than the desired switching signal which is generated by the selected aperture that is coupled to the same sensing circuit. Thus, these delta noise signals mask the desired signal which is being generated at the single selected aperture. Sensing circuit 50 is wound in a complementing pattern as taught in the previously mentioned Harding application to reduce the effects of imperfect cancellation; but there are still certain information patterns that can produce substantial noise and thereby reduce the accuracy margin of the discriminator.

FIGS. 5 and 6 present, when placed side by side with FIG. 5 on the left of FIG. 6 as indicated in FIG. 7, a diagram of the timing logic circuits 11 and details of the X driver circuit 16. These circuits illustrate the manner in which reduced magnitude drive signals may be applied to the memory drive circuits just prior to a read-out interval in order to remove the aforementioned noise mask so that the desired full-select signal may be sensed. The circuits of FIGS. 5 and 6 will be hereafter described in connection with the timing diagram of FIG. 9 wherein there is illustrated by a solid-line wave diagram the magnetomotive force that is applied to a magnetic switching device comprising a crosspoint load in the memory array 21. A dotted-line diagram superimposed on the magnetomotive force diagram in FIG. 8 represents the drive current that is applied to the X coordinate drive circuit 47 in FIG. 3 in conjunction with an identical drive current, not shown in FIG. 8, applied to the Y coordinate drive circuit 48.

In order to facilitate a description of the circuits of FIGS. 5 and 6 and the diagram of FIG. 9, a time scale beginning at zero and extending to five microseconds is indicated at the top of FIG. 9; and legends have been added along the time scale to relate the diagrams to significant circuit operations to be discussed. The specific times that are indicated and hereinafter described are, of course, for illustrative purposes only and should not be considered to limit the scope of the invention in any way. In the following running text, times along the scale of FIG. 9 will be designated by a reference character $t_n$ wherein the subscript $n$ designates the number of microseconds after the zero time point on the scale.

At time $t_0$ a negative clock pulse from clock source 10 is applied to a .5 microsecond delay circuit 63. This delay is not essential to the operation of the invention; but it is useful if the memory is employed in a larger system, such as an electronic telephone central office system, which includes a plurality of memories. The delay circuit 63 provides sufficient time for the central control 12 to recognize from received code signals whether or not the signals are intended for it. The delay circuit 63, and other delay circuits which will be hereinafter mentioned, may be of any suitable type. Many suitable delay devices are commercially available stock items. In such circuits a negative input pulse initiates the timing operation of the delay circuit, and at the end of the delay period a negative output pulse is produced which has a duration that is independent of the applied input pulse duration.

At time $t_{0.5}$ the output of delay circuit 63 is simultaneously applied to the set input of a read-early flip-flop circuit 66 and to a 2.4 microsecond delay circuit 67. The flip-flop circuit is of the type illustrated in FIG. 8 and comprises two cross-coupled AND-NOT logic gates 68 and 69. Gates 68 and 69 are identical so only one is illustrated in detail in FIG. 8. Gate 68 includes two input connections 70 and 71 that are coupled by a pair of diodes 72 and 73 to a terminal 76. These diodes form with a potential source 78 and a resistor 79 an AND gate which has, in addition, the diode 80 for coupling the terminal 76 to the base electrode of a transistor 81. If either of the input leads is grounded, current flows from source 78 through resistor 79 and terminal 76 to the grounded input lead. This prevents conduction in diode 80 and prevents the application of turn-on current to the base electrode of transistor 81. When both of the input leads 70 and 71 are positive, diodes 72 and 73 are reversely biased; and source 78 supplies current through resistor 79, diode 80, and an additional resistor 82 to ground. The potential developed across resistor 82 forward biases the base-emitter junction of transistor 81 to turn the transistor on and clamp its collector electrode to ground.

The output lead 83 connects that collector electrode to any load controlled by the gate. A source 86 fixes the potential of lead 83 when transistor 81 is not conducting. Lead 83 comprises the binary ONE output circuit for the flip-flop and the input lead 70 is the set input circuit thereof.

Gate 69 is similarly arranged so that its input lead 70' comprises the reset input for the flip-flop circuit, and its output lead 83' constitutes the ZERO output of the flip-flop and is connected to a source 86'.

When transistor 81 is conducting and its output lead 83 is clamped at ground potential, that potential is cross-coupled to the input circuit 71' of gate 69 for disabling that gate. Similarly, the output lead 83' of gate 69 is at a positive potential and is connected to the input circuit 71 of gate 68 for supplying an enabling signal thereto. No signals applied to the reset input of the flip-flop circuit in this condition can alter its state, but a ground applied to the set input disables gate 68 and cross-couples a positive voltage from lead 83 to input circuit 71', thereby supplying an enabling signal to gate 69. If input circuit 70' is at that time positive, gate 69 is actuated and produces a negative-going input signal on its lead 83' to indicate that the flip-flop circuit has been triggered to the reset condition. The application of a positive signal to the set input of the flip-flop restores it to the set state in a similar manner.

In FIG. 5, the ONE output of flip-flop 66 is positive-going at the time $t_{0.5}$, and this positive signal persists until $t_{2.25}$. This positive signal is inverted by an AND-NOT gate 87 which is of the same type as the gate 68 illustrated in FIG. 7. The output of gate 87 is applied to two cable driver circuits 88 and 89 which produce a positive signal at their output leads 90 and 91. These output connections are designated XRE for X-read-early and YRE for Y-read-early, respectively. The X-read-early lead 90 is applied to one input of the X driver 16 in FIG. 6 and the Y-read-early lead 91 is applied through a cable 94 to the Y driver 17.

Cable drivers 88 and 89, and all similarly designated circuit elements are of essentially the same configuration as the gate 68 in FIG. 8. The only difference is that the resistor 79 therein is assigned a lower value in the cable driver circuits than in the AND-NOT circuit so that a larger output current can be clamped to ground.

The signals from cable drivers 88 and 89 initiate operations in their respective drivers 16 and 17 to produce drive currents of the form illustrated by the dotted wave diagram in FIG. 9 and to develop the solid line waveform for magnetomotive force at a magnetic switching device in the memory array 21. It can be seen in FIG. 9 that the first step of the drive signal during the preconditioning period of the interrogation interval begins at time $t_{0.5}$ when the read-early flip-flop is set. This preconditioning signal, produced by the driver in FIG. 6 in a manner which will be described, precharges the spurious capacitances that interconnect the various memory circuits. The same signal also magnetically biases all devices linked by the drive circuits receiving such signal toward the B condition illustrated in FIG. 2 if the devices have ONES stored therein, or it magnetically biases the devices toward the D condition if they have ZEROS stored therein.

The duration of the preconditioning interval is fixed to allow sufficient time for the noise generated by the preconditioning signal in the sensing circuit to subside. The time required for the various storage devices in the memory to be completely biased to the B or the D condition is much less than the time required for a complete switching of such bistable magnetic devices. The magnitude of the preconditioning signal must be less than the normal half-select amplitude in each drive circuit so that the selected word of the memory will not be prematurely read out. A quarter-select amplitude has been employed advantageously and produces a predisturb effect in the devices linked thereby which appears to reduce the delta noise effect by a substantial amount.

The output of gate 87 in FIG. 5 is also applied to actuate a .75 microsecond delay circuit 92, and the output of that delay sets a read-late flip-flop circuit 93 which is of the same type as the flip-flop circuit 66. This produces a positive-going voltage at the ONE output of flip-flop 93 between times $t_{1.25}$ and $t_{2.25}$. This positive-going signal is applied by another AND-NOT gate 96 to cable drivers 97 and 98 that have their outputs connected to an X-read-late lead 99 and a Y-read-late lead 100. The latter two leads are applied to additional input connections of the drivers 16 and 17 in FIG. 6 for completing in the output of each of them the normal half-select output signal for accomplishing memory read-out. This signal for each of the two drivers, and the resulting crosspoint magnetomotive force, are illustrated during the read interval in FIG. 8.

At time $t_{1.25}$, when the read-late flip-flop 93 is triggered, the ZERO output thereof goes to ground to initiate the operation of a one-microsecond delay circuit 101 for producing, after the indicated delay time, a negative pulse. The latter pulse resets both the read-early flip-flop 66 and the read-late flip-flop 93. This resetting action takes place at time $t_{2.25}$ as indicated in FIG. 8. Just prior to that reset action, e.g., at about time $t_{1.8}$, clock source 10 supplies a pulse to discriminator 27 in FIG. 1 to sample the output from the memory 21.

It will be noted in FIG. 9 that the negative-going signal transition which began at time $t_{2.25}$ requires a time interval for completion which is approximately twice the time required for the positive-going signal transient which began at $t_{1.25}$ at the beginning of the read portion of the interrogation interval. A signal translation from zero to half-select amplitude also requires about twice as long as the transient at time $t_{1.25}$. These voltage transients in the X and Y coordinate drive circuits have a certain frequency content, as is well known in the art; and the frequencies contained therein are coupled through the aforementioned spurious capacitances 64 to the sensing circuits of the memory.

It has been found that when all other factors influencing the permissible size and duration of a drive current transient are considered, and the duration is set at an optimum value for such factors, the principal energy components of the noise generated by a drive current transition from zero to half-select magnitude are in a frequency range which includes the fundamental output signal frequency of the memory. The fundamental output signal frequency is the frequency represented by the reciprocal of the switching time of the type of bistable magnetic switching devices employed in memory 21. In one particular ferrite sheet memory this fundamental output signal frequency had a value of the order of about 600 kilocycles per second while the half-select noise frequency was about one megacycle per second. Consequently, the noise resulting from transitions of that magnitude and duration could not be readily rejected by the application of conventional filtering techniques in the memory sensing circuits. However, in accordance with the present invention, only the last step of a stepped drive signal occurs during the actual read portion of the memory interrogation interval. Naturally this last step has a smaller amplitude and a shorter duration than does the full transient which extends between zero and half-select magnitude. Because a transient occupies a much narrower time slot, it also includes as its principal energy components voltages which are in a much higher frequency range than are the noise voltages of the normal half-select signal transient. It has been found, in fact, that the frequencies of the principal components differ by a factor of about two. That is, the principal frequencies in the short transient are about twice the frequency of the principal frequencies in the long transient. Consequently, the noise frequencies resulting from the drive signal transient illustrated at time $t_{1.25}$, the short transient, are so much higher in frequency than the fundamental output signal frequency that the noise can be substantially rejected by a conventional low-pass filter network. For this reason the filter 23 is included in the input to sensing amplifier 26 in FIG. 1.

It should be understood that filter 23 need not be a separate network in all applications. In accordance with the present invention, memory systems have been constructed wherein the sensing circuit itself had transmission line characteristics, i.e., wire inductance and circuit capacity to ground, which performed the desired filtering. In addition, sensing amplifier 26 is advantageously adapted to have a high frequency cut-off characteristic which blocks the transition noise frequencies involved. The schematic representation of filter 23 in FIG. 1 includes all such filtering techniques for separating the noise frequencies from the fundamental output signal frequency.

It was previously noted that the transient noise occurring at time $t_{1.25}$, the beginning of the read-out interval, is included in a much narrower time slot than in prior art circuits wherein the transient at that time had the full half-select magnitude in each drive circuit. This narrower noise time slot has an additional beneficial effect of its own. The narrower noise time slot forces the noise that remains to be further separated, time-wise, from the sampling time $t_{1.8}$ so that there is much less chance of noise intruding into the sampling time.

At the end of the interrogation interval of the memory, a time guard space is provided from a time of about $t_{2.3}$ to $t_{2.9}$ in order to allow all memory circuit transients to subside so that the subsequent write-back operations will not be affected thereby. At time $t_{2.9}$ the previously mentioned delay circuit 67 produces a negative output pulse which sets an inhibit flip-flop circuit 102, and the negative pulse also initiates the operation of a .35 microsecond delay circuit 103. Inhibit flip-flop 102 is of the same type as the flip-flop 66 and responds to the set input signal by producing a positive ONE at its output to enable AND-NOT gate 106. The second of the two illustrated input connections to gate 106 is the lead 14 from the central control 12 in FIG. 1. Central control applies a positive voltage to lead 14 when it is desired to write back a ZERO, and this signal voltage completes the enablement of gate 106, which then couples a positive pulse to a cable driver 104 to actuate inhibit driver 18 in FIG. 1. Otherwise, central control 12 applies a ground to lead 14 for disabling gate 106 to permit X and Y write drive signals to write a ONE. Inhibit driver 18 is for this embodiment any of the suitable current pulse drivers known in the art.

When inhibit driver 18 is actuated it causes a half-select signal of read polarity to be applied to the inhibit drive circuit of the memory so that a ZERO is written therein. Noise produced at this time by the half-select signal in the inhibit circuit does not present a read-out problem because the sense circuits are disabled by the absence at discriminator 27 of a sampling signal from clock source 10. However, there is an indirect influence of the inhibit signal which is of importance in connection with the invention. This inhibit signal in the read direction drives all memory storage devices which are linked by the inhibit drive circuit toward the B state indicated in FIG. 2 if they are storing a ONE and toward the D state if they are storing a ZERO.

At time $t_{3.25}$ the delay circuit 103 in FIG. 5 produces a negative pulse to set a write flip-flop circuit 107 for producing a positive ONE output pulse. This pulse is coupled by two AND-NOT gates 108 and 109 to the input connections of four cable driver circuits 110, 111, 112, and 113. The output connections from those cable drivers are applied to the X and Y drivers 16 and 17 in FIG. 6 to initiate the write-back operation. As will be noted in connection with FIG. 6, the drivers 16 and

17 are driven directly to their full output signal amplitude for generating the write half-select signals that are applied to the selected location in memory 21.

The output of delay circuit 103 was also applied to a one-microsecond delay circuit 116, and at time $t_{4.25}$ a negative output pulse from that delay circuit resets the write flip-flop 107 to terminate the write back interval. The output of delay 116 is also applied to a .35 microsecond delay circuit 117 which later resets the inhibit flip-flop 102 at time $t_{4.6}$ thereby ending one read-write cycle of the memory.

Several conditions are noted here in summary to show the different flux density states in which the storage devices of the memory array may be left, depending upon their state at time $t_{2.9}$ and upon the nature of the information which is to be written back into the memory. Assume first that it is desired to write a ONE. Under these conditions inhibit drive is not applied, and the selected device in the memory is driven to the A condition indicated in FIG. 2. The devices which receive only at a half-select X signal or a half-select Y signal are biased to the A state if they store a ONE and to the C state if they store a ZERO. However, if a ZERO is to be written into the memory, the situation is different for devices in each inhibit, or digit plane. The selected device in the digit plane is driven to the D state. Each of the devices in the digit plane which receives an X or a Y half-select write signal also receives an inhibit signal of similar magnitude, but opposite polarity. Since the inhibit signal starts before, and persists after, the X or Y half-select signals, the half-selected devices which receive both an inhibit and an X or a Y signal are driven ultimately to the B or the D state for ONES and ZEROES, respectively. Likewise, all other devices linked to the same inhibit plane are biased to the B and D conditions for stored ONES and ZEROS, respectively, because they receive only the inhibit half-select signal.

Thus, at the end of a read-write cycle, if a ONE had just been written into the memory, without inhibit drive, the half-selected holes are biased to either the A or the C condition and the nonselected holes are unchanged. Likewise, if a ZERO had just been written, with inhibit drive, the half-selected holes and the nonselected holes are all left in either the B or the D state. Thus, at the end of the read-write cycle each of the devices in a particular inhibit plane may be in any one of the four states indicated in FIG. 2, depending upon its information content, its previous history of drive signals, and the type of binary signal just written into the memory. However, in accordance with the invention, and in the manner just described in connection with FIG. 5, a preconditioning drive is applied to all of the half-selected devices in the memory just prior to the beginning of the read portion of the interrogation interval. This preconditioning drive has an amplitude less than normal half-select amplitude, and it is in the read direction. Such preconditioning drive biases all ONE devices toward the B state and all ZERO devices toward the D state. In this fashion the delta noise in the circuit is reduced to a low level which permits discriminator 27 in FIG. 1 to operate in a proper manner for distinguishing between ONE and ZERO output signals from the memory.

In FIG. 6 are illustrated the details of a typical split driver circuit which is advantageously used in accordance with the present invention, to respond to signals from the timing logic in FIG. 5 to produce the pre-read reduced amplitude drive for the memory array 21. In the X driver 16 a read driver amplifier 118 is provided to receive the X-read-early and X-read-late outputs from the timing logic in FIG. 5 on leads 90 and 99, respectively. The signals on lead 90 are coupled by a capacitor 119 to the base electrodes of two parallel connected transistors 120 and 121. These transistors, and two similarly connected transistors 122 and 123 which are coupled to lead 99 by a capacitor 126, are arranged as a current driver in a manner which is similar to that shown in a copending application Serial No. 241,684 filed December 3, 1962, in the name of P. A. Harding and E. H. Siegel, Jr., and entitled "Current Drive Circuit." In that application all four transistors 120 through 123 were operated essentially in parallel, but in this case the transistors are split into pairs to receive the read early and read late signals separately. The collector electrodes of all four transistors are connected together at a common junction 127, and this junction is connected to four parallel-connected primary windings of four transformers 128, 129, 130, and 131. Each of these transformers has two primary windings and two secondary windings coupled together on a common core, but each primary-secondary winding pair is electrically connected in a separate circuit from the other pair on the same transformer. Thus, the read driver junction 127 is connected to one terminal of each of the primary windings 128*pr*, 129*pr*, 130*pr*, and 131*pr*, and the opposite terminals of those windings are all connected to a potential source 125. Secondary windings corresponding to the last-mentioned primary windings are connected in a series loop circuit with a resistor 132 that is connected between ground and the collector electrode of an input marking transistor 133 in memory 21. Amplifier 118 and the associated transformers comprise switching means controlled by input signals for adjusting output current magnitude in discrete steps, in accordance with the different combinations of actuated amplifier input leads.

This arrangment of parallel-connected primary windings and series-connected secondary windings has the effect of generating in the secondary circuit a current which is a function of the average value of the currents in the four transistors 120 through 123. Thus, when the transistors 120 and 121 are conducting during the preconditioning part of an interrogation interval, each transistor may be conducting .25 ampere to produce a total current at junction 127 of .5 ampere. However, in the secondary circuit, after the averaging has been performed by the four-transformer connections, the secondary current is only .125 ampere. When the X-read-late signal drives transistors 122 and 123 into conduction, they also handle .25 ampere each to increase the current at junction 127 to one ampere and raise the secondary current to .25 ampere.

The X write signals from the timing logic appear on leads 114 and 115 at the input to a write driver amplifier 136 which is identical to the amplifier 118, and which drives current through a junction 137 to the four parallel connected primary windings 128*pw*, 129*pw*, 130*pw*, and 131*pw* which are also connected to source 125. These primary windings are coupled through their respective transformers to corresponding secondary windings that are connected in a series loop circuit with a resistor 138 for supplying drive current to another marker transistor 139 in memory 21. Resistor 138 is also returned to ground.

Two short diagonal lines 140 and 141 connected to each of the read and write secondary loop circuits indicate schematically that those circuits are also connected to a plurality of other marker transistor pairs corresponding to the marker transistors 133 and 139. The latter two transistors receive control signals from the X address translator 19′ to select a particular input to the X access circuits 142 within memory 21. This type of arrangement is illustrated in detail in the United States Patent 3,205,481 in the names of C. G. Corbella, P. A. Harding and E. H. Siegel, Jr., and entitled "Matrix Selection Circuit With Bias Means for Nonselected Circuits in One Set of Matrix Coordinate Drive Circuits." Briefly, however, the actuation of transistors 133 and 139 and their counterparts, all of which comprise a plane selection matrix, by translator 19′ selects a particular plane in a three-dimensional access matrix within the access circuit 142. Translator 19′ also actuates a transistor 143 to select a particular row circuit in the selected plane of the access matrix and thereby completes circuits to ground for the two marker transistors. Transistor 143 is also connected, as indicated by the short diagonal line 144 at its collector, to corresponding rows in other planes of the access matrix. One of the circuits to transistor 143 comprises a connection from the emitter electrode of transistor 133 through the primary winding of a transformer 146 and a diode 147 to the collector electrode of transistor 143. The primary winding of a transformer 148 and a diode 149 similarly connect transistor 139 to transistor 143. Transformers 146 and 148 are coupled to read and write buses, respectively, in the access circuits and ultimately connect to an X drive lead 47′ that is coupled to a bistable magnetic device in the memory array, all as shown by Corbella et al. That device is schematically indicated in FIG. 6 by the toroidal core 150.

The Y driver 17 is similarly connected to operate Y access circuits 151 for supplying drive signals to a Y drive lead 48′ for the device 150. Details of the connections in this case, and of the Y address translator, are not shown here since they do not comprise a part of the present invention, and they are similar to those shown for the X driver. Thus, the X and Y drive leads for the devices in the memory 21 are supplied with drive signals, which are substantially identical in configuration, by separate, split, current drivers which are under the control of a common timing logic circuit 11. This timing logic causes these split drivers to supply to their corresponding device drive circuits reduced magnitude pre-read currents to precharge the spurious capacitances interconnecting the drive circuits and to bias, at least partially, each of the magnetic devices linked by the selected drive circuits toward predetermined flux density conditions so that noise masking of the desired memory output signals is reduced to a level which permits accurate discrimination between different types of binary bits making up those signals.

The multistep drive just described for the read signal rise time is further advantageously employed in conjunction with the noise reduction circuits in the copending application Serial No. 253,227, filed January 22, 1963, of R. M. Genke and P. A. Harding. In that application a discriminator input clamp is disabled just after the start of an interrogation interval to connect a signal-charged capacitor in series with the discriminator input for providing a noise canceling voltage at discriminator sampling time. When the stepped drive described herein is utilized for a memory wherein the sensing circuits drive such noise reduction circuits, the clamp is disabled during a step plateau. Accordingly, the resulting signal-charged capacitor voltage is more uniform and the clamp disabling times are less sensitive so that the overall operation of such noise reduction circuits is improved.

The general technique and benefits of providing multistep drive signal transitions have been demonstrated in connection with FIGS. 5 through 9 for only the application of read drive signals in a ferrite sheet memory. Multistep drive signal transitions are, however, also beneficial at other points in a memory operating cycle. Thus, for example, they can be employed also on the leading edges of write-in drive signals and on the trailing edges of either read-out or write-in drive signals. In this connection FIG. 10 shows a modified portion of the logic circuits of FIG. 5 which are advantageously employed to provide two-step application and removal of write-in X and Y drive signals, as well as two-step application of inhibit signals. The principal change in the logic circuits is the division of the functions of flip-flops 102 and 107 in FIG. 5 among three flip-flops in FIG. 10 and corresponding changes in the flip-flop output circuits. The logic circuits for the interrogation part of the memory cycle are the same as those shown in FIG. 5 so they are repeated in FIG. 10 only to the extent necessary to indicate the relationship to the circuits of FIG. 10. FIG. 11 is a wave diagram illustrating the changes produced in the wave diagram of FIG. 9 when circuits of the type shown in FIG. 10 are employed. The diagram of FIG. 11 assumes a memory cycle wherein a binary ZERO is to be written in order that the two-step drive on an inhibit drive signal may be illustrated.

In FIG. 10 the delay circuit 101 produces an output pulse at times $t_{2.5}$. This pulse is applied to the reset input of the read late flip-flop 93 to terminate the read-out drive signals as previously described. The same pulse is also applied to the set input of an inhibit flip-flop 102' thereby producing at the binary ONE output of the flip-flop a positive-going pulse with a leading edge which occurs at the time $t_{2.25}$. This positive-going pulse actuates an inverting gate 106'' that had previously been enabled by another positive-going signal from the control 12 when the central control directs that a ZERO be written in the memory. The coincidence of two positive-going signals on the inputs of inverting gate 106'' causes a negative-going pulse to be applied to the input of a cable driver 160, and the output of that cable driver is a positive pulse that is applied to the inhibit driver 18 in FIG. 1 as the inhibit early, IE, signal. For this embodiment of the invention the driver 18 is advantageously of the same type illustrated in FIG. 6 for the X driver 16, and it is coupled to a group of digit plane inhibit circuits in memory array 21 in the manner illustrated in the copending application Serial No. 294,506, filed July 12, 1963, of P. A. Harding.

At time $t_{2.9}$ the delay 67 in FIG. 10 provides an output pulse which is simultaneously applied to the delay circuit 103 and to the set input of a write and inhibit flip-flop 102''. The setting of flip-flop 102'' produces a positive-going pulse at the ONE output thereof, which is coupled to the inverting gate 106' and to a further inverting gate 161. Since the gate 106' is already enabled by the positive-going signal from control 12 on the lead 14, it now produces a negative-going output pulse that is inverted and coupled by a cable driver 162 to the inhibit driver 18 as the inhibit late, IL, signal. The IE and IL signals which are applied to different input connections of inhibit driver 18 causes that driver to produce the inhibit drive signal with a two-step leading edge as shown in FIG. 11.

The ONE output of flip-flop 102' is also inverted by the gate 161 and the resulting negative-going pulse is inverted and coupled by the cable drivers 110 and 112 on leads 114 and 114' to the X and Y drivers 16 and 17 as their write early signals, XWE and YWE, respectively. Lead 114' is included in the cable 94 for that purpose. These signals cause each of the drivers to produce an output current of the quarter-select amplitude illustrated in FIG. 11 and which is the initial step in the application of the complete half-select drive current by each such driver.

During the application of the first step of the write drive signals XWE and YWE the delay circuit 103 is operating and at time $t_{3.25}$ it produces an output pulse which initiates operation of the delay 116 and also sets the write flip-flop 107. The positive-going ONE output of flip-flop 107 at that time is coupled by inverting gates 108 and 109 to cable drivers 111 and 113. The latter cable drivers produce the X-write-late, XWL, and the Y-write-late, YWL, signals on leads 115 and 115' for controlling the X and Y drivers, respectively, and cause such drivers to produce their complete half-select drive current outputs for generating the final step of the write magnetomotive force in a selected crosspoint of the memory 21.

It will be noted in FIG. 11 that the plateau between the first and second step transitions for the X and Y magnetomotive forces is considerably shorter than the similar plateau in the inhibit drive current. The longer inhibit plateau is not essential to the invention. It is extended beyond its normal overlap of the X and Y currents, as shown in FIG. 9, because simplified logic is employed in FIG. 10 to utilize more efficiently the write and inhibit logic components in the embodiment of FIG. 5.

At the time $t_{4.25}$ the delay circuit 116 in FIG. 10 produces an output pulse which resets the write flip-flop 107 and initiates operation of the delay circuit 117. The resetting of write flip-flop 107 removes the XWL and YWL control signals from the X and Y drivers, thereby causing such drivers to reduce their output current and generate the first step reduction in the crosspoint magnetomotive force as illustrated in FIG. 11. At time $t_{4.8}$ delay circuit 117 produces an output pulse which resets the write and inhibit flip-flop 102'' thereby removing the XWE and YWE driver control signals from the X and Y drivers to generate the final step in the reduction of the crosspoint magnetomotice force at the selected device in the memory. The same output pulse from delay circuit 117 also resets the inhibit flip-fllop 102' at the same time that the flip-flop 102'' was reset so that the gates 106' and 106'' are simultaneously disabled to remove the IE and IL control signals from the inhibit driver. This latter action terminates the inhibit drive current in a single step which occurs at substantially the same time as the last step in the reduction of the crosspoint magnetomotive force at the selected device as illustrated in FIG. 11.

The benefits realized by utilizing multistep drive signal transitions during a write-in interval of the memory are similar to those already described for the interrogation interval. For example, during drive signal rise times, such as on application of X and Y read and write signals and of inhibit signals, the spurious capacities of the memory are precharged so that when coercive field intensity is attained subsequently a greater proportion of the available energy is utilized to control magnetic device switching. During any signal rise or fall time when multistep signal transitions are employed, such as the enumerated rise times and the X and Y write fall times, the magnitudes of the inductive surges in the drive circuits at any instant are reduced so that circuit elements are subjected to less voltage stress. Also, the use of stepped drives permits a substantial portion of magnetic flux shuttling to subside before a device is switched. Furthermore, the reduced magnitude of voltage surges at any one time during the turn-off of a drive signal produces smaller noise voltages in the memory sensing and inhibit circuits so that less time is required for dissipation of such noises before a new memory operation can be safely undertaken without significant danger of noise interference.

The benefit of reduced noise dissipation time can be used to compensate at least partially for the increased cycle time which is required by the use of multistep drives. In other words, the multistep drive provides the designer with another tool which may be employed to obtain a more beneficial compromise between sensing circuit noise and memory cycle time. It is advantageous from a noise standpoint to utilize the multistep drive for as many drive signal transitions as possible without unduly lengthening the memory cycle time.

Although this invention has been described in connection with a particular embodiment thereof it is to be understood that additional embodiments and modifications which will be apparent to those skilled in the art are included within the spirit and scope of the invention.

What is claimed is:

1. In a magnetic memory that is operable in a predetermined cycle of read-out and write-in intervals and that has first and second drive circuits and a sensing circuit magnetically coupled to said drive circuits by a plurality of switchable bistable magnetic storage devices, said devices utilizing magnetic material with a predetermined switching time, means applying signals of a first amplitude that is insufficient to switch said devices to said first and second drive circuits before said read-out interval in said cycle, and thereafter during said read-out interval applying to said drive circuits signals of a second amplitude which is sufficient to switch said devices, and said sensing circuit including low-pass filter means having a high frequency cut-off point above a frequency which is the reciprocal of the switching time of said device material.

2. In a magnetic memory, plural magnetic storage devices actuatable to different flux density conditions to represent different binary coded information bits, a source of current, output connections, switching means responsive to actuating signals for controlling current magnitude, means connecting said switching means in circuit with said current source and said output connections, drive circuits coupling current between said output connections and selectable groups of said storage devices to actuate such devices for cyclically reading information out of and writing information into the memory, and means applying actuating signals to said switching means to change the magnitude of current in said drive circuits so that at least one such change is accomplished in a plurality of discrete steps.

3. The magnetic memory in accordance with claim 2 in which said switching means comprises a current driver with separately actuatable input connections for receiving signals to cause said driver to supply different increments of current to said output connections in response to the actuation of different combinations of said input connections, a source of input pulses is coupled to said applying means, and said applying means includes logic circuits coupling said actuating signals to each of said input connections at different times in response to one of said input pulses.

4. The magnetic memory in accordance with claim 3 in which said applying means includes logic circuits coupling actuating pulses to said input connections at different times in response to the leading edge of each of said input pulses from said source and for thereafter terminating said actuating pulses simultaneously.

5. The magnetic memory in accordance with claim 3 in which said logic circuits couple actuating pulses to said input connections at different times in response to the leading edge of each alternate one of said input pulses.

6. The magnetic memory in accordance with claim 3 in which said logic circuits couple actuating pulses to said input connections in response to at least alternate ones of said input pulses and terminate at different times the actuating pulses coupled in response to such input pulses.

7. The magnetic memory in accordance with claim 3 in which said drive circuits include inhibit circuits coupled to other selectable groups of the same devices included in the first-mentioned selectable groups of said devices for coupling current to at least one of said other selectable groups to inhibit the writing of information therein, said switching means includes an additional current driver similar to the first-mentioned driver applying current pulses to said inhibit circuits, and said logic circuits apply and remove actuating pulses at different inputs of said additional driver, at least one of the application or removal of such actuating pulses being accomplished at different times for the different additional driver inputs in response to each alternate one of said input pulses.

8. In a magnetic memory that is operable in a predetermined cycle of interrogation and write-in intervals, a plurality of switchable bistable magnetic devices arranged in a matrix array, each of said devices being switchable from one state to the other by the application of a magnetomotive force of predetermined intensity, first and second drive circuits coupled to said devices for applying coincident signals to generate said force at selected ones of said devices, read signal generating means producing stepped signals increasing with respect to time, the last step of each of said signals attaining a level which is sufficient to generate one-half of said force, and means coupling a stepped signal from said generating means to both of said drive circuits in coincidence during said interrogation interval.

9. The magnetic memory in accordance with claim 8 in which each of said read generating means includes plural pulse translating circuits having their outputs connected in parallel, and said coupling means includes a source of clock pulses, logic circuits connected to the output of said source and responsive thereto for actuating a first portion of said translating circuits during the entire interrogation interval and actuating another portion of said translating circuits during only the terminal portion of said interrogation interval, and means coupling to said drive circuits a signal derived from said parallel connected outputs.

10. The magnetic memory in accordance with claim 8 in which there is provided in addition write signal generating means producing signals having an amplitude which is sufficient to generate one-half of said force and having a polarity opposite to the polarity of the output from said read generating means, means coupling said write generating means signal to both of said drive circuits in coincidence during said write-in interval, and means applying to selected ones of said devices during said write-in interval an inhibiting magnetomotive force of one-half said predetermined intensity and with the same polarity as said read generator output.

11. The magnetic memory in accordance with claim 10 in which each of said read generating means includes plural pulse translating circuits having their outputs connected in parallel, and said coupling means includes a source of clock pulses, logic circuits connected to the output of said source and responsive thereto for actuating a first portion of said translating circuits during the entire interrogation interval and actuating another portion of said translating circuits during only the terminal portion of said interrogation interval, and means coupling to said drive circuits a signal derived from said parallel connected outputs.

12. The magnetic memory in accordance with claim 8 which comprises in addition a sensing circuit magnetically coupled to said drive circuits by said devices, and low-pass filter means in said sensing circuit for rejecting substantially all frequencies above a frequency which is the reciprocal of the switching time of said devices.

13. The magnetic memory in accordance with claim 9 which comprises in addition a sensing circuit magnetically coupled to said drive circuits by said devices, and low-pass filter means in said sensing circuit for rejecting substantially all frequencies above a frequency which is the reciprocal of the switching time of said devices.

14. The magnetic memory in accordance with claim 8 in which said matrix array is equilateral.

15. The magnetic memory in accordance with claim 13 in which said matrix array is equilateral.

16. The magnetic memory in accordance with claim 8 in which a sensing circuit is coupled to said drive circuits by said devices, and said sensing circuit has transmission line characteristics severely attenuating frequencies above a frequency which is the reciprocal of the switching time of said devices.

17. The magnetic memory in accordance with claim 8 in which a sensing circuit is coupled to said drive circuits by said devices, an amplifier is coupled to the output of said sensing circuit, and said amplifier has a high frequency cut-off point characteristic which is above a predetermined frequency which is the reciprocal of the switching time of said devices but which is below the principal signal frequency components of said last step.

18. The magnetic memory in accordance with claim 17 in which said sensing circuit has transmission line characteristics severely attenuating frequencies above said predetermined frequency.

19. In a magnetic memory system wherein binary coded information is stored in an array of bistable magnetic devices, information is written in by cooperative action of half-select amplitude current pulses in three coincident current circuits during a write-in interval, information is read out by the cooperative action of half-select amplitude current pulses in only two of said circuits, and each of said devices may in each of its stable conditions rest in any one of at least two remanent flux states depending upon its previous history of half-select amplitude drive signals, the improvement which comprises, a read-out circuit linking all of said devices linked by the third one of said drive circuits, said read-out circuit being coupled to each of said drive circuits so that with respect to any one of such drive circuits the signals coupled through a pair of said devices from such one drive circuit to said read-out circuit are of opposite polarity, means applying to said two drive circuits during said interrogation interval current pulses of different selectable magnitudes, and means controlling said applying means to select successively in said interrogation interval a pulse of less than said half-select amplitude followed by a pulse of said half-select amplitude, so that each of said devices in its respective prevailing stable condition is magnetically biased toward a predetermined one of said remanent flux states.

20. In a magnetic memory system in which information is stored during a write-in interval and from which information is read out during an interrogation interval, a first group of bistable magnetic storage devices each being linked by a first drive circuit, a second group of bistable magnetic storage devices each linked by a second drive circuit, each of said first and second drive circuits being capacitively coupled to other circuits of said system by spurious capacitances, all of said devices, in each stable state thereof, resting in any one of a plurality of remanent magnetic flux conditions of somewhat different flux density, a read-out circuit linking a plurality of devices in each of said first and second groups, said plurality of devices magnetically coupling to said read-out circuit signals appearing in said drive circuits, first and second pulse drivers applying to said first and second drive circuits, respectively, signal pulses of different selectable magnitudes, at least one of such magnitudes for each of said drivers being half the magnitude required to trigger one of said bistable devices, and timing means controlling said drivers during said interrogation interval to apply to their respective drive circuits, first, a pulse with magnitude less than the half-magnitude pulse for triggering a storage device to precharge said spurious capacitances and to apply magnetic bias of predetermined polarity to all of said plurality of devices, and, second, a pulse of said half-magnitude.

21. In a coincident current magnetic memory wherein binary ONE and ZERO bits of information are stored by setting a bistable magnetic switching device to one of its two stable conditions by application of a coercive magnetic field magnitude of appropriate polarity, at least two drive circuits are provided for supplying to selected devices current pulses of one-half coercive magnitude and a first polarity during memory interrogation time and a second polarity during memory write-in time, and an inhibit drive circuit is provided for supplying current pulses of one-half coercive magnitude and said first polarity during said write-in time to write a binary ZERO, the improvement which comprises time base means dividing each interrogation time interval into an initial preconditioning period and a subsequent read-out period, means connected to said time base means and applying to said two drive circuits said first polarity pulses with a fraction of said one-half coercive magnitude during said preconditioning period, and means connected to said time base means and actuating the last mentioned applying means during said read-out period to increase said first polarity pulses to said one-half coercive magnitude.

22. A magnetic memory comprising an apertured sheet of bistable magnetic material comprising at each aperture therein a discrete bistable magnetic device, first and second drive circuits linking first and second groups of apertures in said sheet and having at least one aperture common to both of said groups, an inhibit drive circuit linking some apertures of each of said first and second groups and linking said common aperture, a sensing circuit linking apertures that are also linked by said inhibit drive circuit, said apertures being of such dimension with respect to said drive circuits that said drive circuits and inhibit circuit are inherently capacitively coupled to one another at the fundamental frequency of memory operation, means applying pulse signals to said first, second, and inhibit drive circuits to write a predetermined binary information bit into the device comprising said common aperture, means applying pulse signals to only said first and second drive circuits to read out information from said common device to said sensing circuit, the last mentioned applying means comprising two pulse generating circuits for each of said first and second drive circuits, and timing means actuating for each of said first and second drive circuits the first pulse generating circuit to precharge said capacitive coupling and to bias magnetically the devices of said first and second groups, said timing means thereafter actuating both said first and second pulse generating circuits together to apply signals of appropriate polarity and magnitude to switch said common apertured device from a first to a second one of its bistable conditions.

23. The magnetic memory in accordance with claim 22 in which the groups of devices linked by said first and second drive circuits are of equal size.

24. In a magnetic memory having read-out drive circuits and a sensing circuit coupled thereto by means of a plurality of bistable magnetic storage devices, said devices being switchable between their two stable states to generate a read-out signal in said sensing circuit by the application of coincident full-drive amplitude signals to said drive circuits during a memory read-out interval, and said devices generating noise signals in said sensing circuit in response to the application to said drive circuits of less than coincident full-amplitude drive signals, the improvement comprising means applying drive signals to each of said read-out drive circuits in at least one fractional drive amplitude signal step prior to the start of the memory read-out interval and thereafter applying full-drive amplitude signals during said read-out interval, the signal transition between said fractional and full amplitude signals having determinable principal frequency components, and a low-pass filter connected in said sensing circuit to reject said principal frequency components.

References Cited by the Examiner

UNITED STATES PATENTS 3,238,516 3/1966 Hore -------------- 340—174

JAMES W. MOFFITT, *Acting Primary Examiner.*

S. URYNOWICZ, *Assistant Examiner.*